United States Patent
Kim et al.

(10) Patent No.: US 10,414,451 B2
(45) Date of Patent: Sep. 17, 2019

(54) AIR PASSAGE TYPE WHEEL DEFLECTOR AND VEHICLE HAVING THE SAME

(71) Applicants: Hyundai Motor Company, Seoul (KR); Kia Motors Corporation, Seoul (KR)

(72) Inventors: Cheol-O Kim, Suwon-Si (KR); Jae-Young Kang, Yongin-Si (KR); Hyun-Seok Jung, Suwon-Si (KR); Jeong-Ho Lee, Suwon-Si (KR); Ho-Jeong Choi, Siheung-Si (KR); Jun-Young Ahn, Suwon-Si (KR); Hyun-Ah Kim, Busan (KR); Byung-Hoon Kang, Anyang-Si (KR); Yun-Woo Chung, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/837,972

(22) Filed: Dec. 11, 2017

(65) Prior Publication Data
US 2019/0002038 A1    Jan. 3, 2019

(30) Foreign Application Priority Data
Jun. 28, 2017 (KR) .................. 10-2017-0081828

(51) Int. Cl.
*B60J 9/00* (2006.01)
*B62D 35/00* (2006.01)
(Continued)

(52) U.S. Cl.
CPC ........... *B62D 35/008* (2013.01); *B62D 25/16* (2013.01); *B62D 35/02* (2013.01); *B60Y 2306/09* (2013.01)

(58) Field of Classification Search
CPC ........ H03M 1/468; H03M 1/466; H03M 1/38; H03M 1/12; H03M 1/804; B05B 1/265;
(Continued)

(56) References Cited

U.S. PATENT DOCUMENTS 3,563,598 A * 2/1971 Wilfert ................. B60Q 1/0005
296/208
4,262,953 A * 4/1981 McErlane ............ B62D 35/001
296/180.4
(Continued)

FOREIGN PATENT DOCUMENTS

KR          20050118985 A      12/2005

*Primary Examiner* — Kiran B Patel
(74) *Attorney, Agent, or Firm* — Morgan, Lewis & Bockius LLP

(57) ABSTRACT

An air passage type wheel deflector applied to a vehicle may include a deflector body 10 fastened to the floor panel by screws 40 and mounted at the rear wheel 120 side, an air duct 20 forming an air passage 20-1 for forcing the air introduced externally to flow downward and discharge in a state of being covered by the deflector body 10 coupled to the air duct, and a plurality of ribs 30 disposed in the deflector body 10 at a certain rib spacing and positioned in the space of the air passage 20-1 so that robustness against strike by chipping is maintained and at the same time aerodynamic performance is improved resulting from improvement of the kick-up function by the air passage 20-1.

9 Claims, 5 Drawing Sheets

(51) Int. Cl.
*B62D 25/16* (2006.01)
*B62D 35/02* (2006.01)

(58) Field of Classification Search
CPC ....... B05B 1/267; B05B 7/144; B62D 35/001; A01D 2101/00
USPC ..................................................... 296/180.1
See application file for complete search history.

(56) References Cited

U.S. PATENT DOCUMENTS

| | | | | |
|---|---|---|---|---|
| 4,455,045 A * | 6/1984 | Wheeler | ................ | B62D 35/00 105/1.2 |
| 4,549,762 A * | 10/1985 | Burk | ...................... | B60K 11/08 180/68.1 |
| 4,640,541 A * | 2/1987 | FitzGerald | ........... | B62D 35/001 280/851 |
| 4,706,615 A * | 11/1987 | Scadding | ................. | F01P 11/10 123/198 E |
| 4,838,603 A * | 6/1989 | Masoero | .............. | B60Q 1/0005 296/180.1 |
| 4,904,015 A * | 2/1990 | Haines | ................. | B62D 35/001 296/180.3 |
| 5,277,444 A * | 1/1994 | Stropkay | .............. | B62D 25/168 280/848 |
| 5,382,070 A * | 1/1995 | Turner | ................. | B62D 35/007 296/180.1 |
| 5,498,203 A * | 3/1996 | Reichert | ............... | F24F 13/068 454/289 |
| 5,678,884 A * | 10/1997 | Murkett | ................. | B60K 13/02 296/180.1 |
| 5,688,020 A * | 11/1997 | Burg | .................. | B62D 33/0273 296/180.1 |
| 6,224,135 B1 * | 5/2001 | Rehkopf | .................... | B60J 1/20 296/91 |
| 6,230,832 B1 * | 5/2001 | von Mayenburg | .... | B60K 11/08 180/68.1 |
| 6,241,302 B1 * | 6/2001 | Rehkopf | ................ | B60J 1/2008 296/91 |
| 6,428,084 B1 * | 8/2002 | Liss | ..................... | B62D 35/001 296/180.1 |
| 6,517,140 B2 * | 2/2003 | Wilde | ........................ | B60J 1/20 296/180.1 |
| 6,712,425 B2 * | 3/2004 | Brulhart | ................. | B62D 25/18 296/180.1 |
| 8,042,861 B2 * | 10/2011 | Molnar | ................. | B62D 35/007 296/154 |
| 8,297,685 B2 * | 10/2012 | Wolf | .................... | B62D 35/005 296/180.3 |
| 9,662,967 B2 * | 5/2017 | Rutschmann | .......... | B60K 13/02 |
| 10,227,095 B2 * | 3/2019 | Gaylard | ............ | B62D 35/008 |
| 2002/0067049 A1 * | 6/2002 | Pettey | .................. | B62D 35/007 296/180.5 |
| 2006/0252361 A1 * | 11/2006 | Henderson, II | ...... | B62D 35/001 454/118 |
| 2018/0015966 A1 * | 1/2018 | Tongue | ................. | B62D 35/001 |
| 2019/0031252 A1 * | 1/2019 | Demetrio | ............ | B62D 35/005 |
| 2019/0039664 A1 * | 2/2019 | Tjoelker | ................ | B62D 35/02 |
| 2019/0144052 A1 * | 5/2019 | Magee | ................. | B62D 35/001 |

* cited by examiner (SECTION A-A)

(SECTION B-B)

(SECTION C-C)

AIR PASSAGE TYPE WHEEL DEFLECTOR AND VEHICLE HAVING THE SAME

CROSS-REFERENCE(S) TO RELATED APPLICATIONS

The present application claims priority to Korean Patent Application No. 10-2017-0081828, filed on Jun. 28, 2017, the entire contents of which is incorporated herein for all purposes by this reference.

BACKGROUND OF THE INVENTION

Field of the Invention

The present invention relates to a wheel deflector, and more particularly, to a vehicle incorporating an air passage type wheel deflector with rigidity enhanced and aerodynamic performance efficiency improved.

Description of Related Art

Since wheel deflectors arranged at wheel sides, in general, not only withstand strike by chipping but also control flow of the air flowing into wheels during running of a vehicle so that aerodynamic performance that directly affects fuel efficiency of the vehicle is improved, practical use of them has been very increased.

As such, the wheel deflectors are required to be made in such a manner that an effect of improving aerodynamic performance, measures for preventing breakdown thereof, minimization of noise to be transmitted to rear seats, the feeling of harmonizing with surrounding parts thereof, securing quality of outward appearance and the like are harmonized.

For example, by applying the criteria for an amount of overlap with the tire, angle externally exposed and dimensions to the wheel deflectors, the wheel deflectors can secure the effect of improving the aerodynamic performance while securing the feeling of harmonizing with surrounding parts and the quality of outward appearance when they are mounted on the outside of the vehicle. Furthermore, rigidity of the wheel deflectors is secured by reinforcing thickness thereof by forming ribs and increasing radius values R of bent portions so as not to be broken and ruptured by impact due to chipping.

Therefore, since wheel deflectors designed in such a manner that essential considerations are harmonized keep the rigidity against strike by chipping of stones or gravels bouncing off and flying away from wheels and at the same time allow for control of flow of the air flowing into the wheels so that aerodynamic performance which must be possessed by aerodynamic performance parts is improved, such wheel deflectors are used in many types of vehicles.

However, there must be a situation where the rigidity of the wheel deflectors is not sufficient to withstand the harsh road condition under which the wheel deflectors are subjected to continuous strike by chipping.

The reason for this is that securing the rigidity by adding ribs or increasing value of curvature (radius) in a portion of the wheel deflectors to be broken is inevitably limited in terms of the quality of outward appearance of the wheel deflectors, which cannot be ignored, and it is difficult to fundamentally solve a problem of breakage (damage and rupture) that may be caused by frequent strike by chipping under harsh road condition even if thickness of the deflector body is reinforced by adding the ribs or increasing the value of curvature (radius).

Moreover, another reason is that it is required to also consider a condition that the quality of outward appearance of the wheel deflectors cannot but be further deteriorated because a manner of fastening a screw mounting of the wheel deflectors to a vehicle body causes direct exposure to the outside.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air passage type wheel deflector and a vehicle having the same, the air passage type wheel deflector being made such that robustness of a body of the wheel deflector is maintained by associating an air passage added to shape of the wheel deflector for improvement of aerodynamic performance with ribs to absorb impact of strike by chipping of foreign matters during running of a vehicle and particularly, aerodynamic performance is improved by making the air passage as a nozzle to control flow of the air in the air passages and thereby preventing formation of vortex in a space around a tire and in turn improving air resistance.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention for accomplishing the object as described above, there is provided an air passage type wheel deflector including an air passage formed by combining an air duct with a deflector body such that air introduced externally is forced to flow downward and discharge.

In an exemplary embodiment of the present invention, the air passage is formed to have a cross-sectional shape of a half-funnel, in which inflow and outflow of the air are formed substantially vertically with respect to each other. The deflector body and the air duct are fused together at their respective rims having a stepped section as fusing portions.

In an exemplary embodiment of the present invention, the deflector body may include a blocking wall, an upper flange bent from the blocking wall, and a lower flange bent from the blocking wall in a direction opposite to the direction in which the upper flange is bent, wherein the air duct may include a nozzle body coupled to the blocking wall and an inlet portion protruding from the nozzle body and wherein the air passage allows the air to be introduced by an air inflow height formed by the upper flange and the inlet portion and allows the air to be discharged by an air outflow width formed by the nozzle body and a lower portion of the blocking wall.

In an exemplary embodiment of the present invention, the air passage is gently curved from the air inflow height to the air outflow width and the air outflow width is formed to be smaller than the air inflow height so that flow of the air passing through the air passage is accelerated.

In an exemplary embodiment of the present invention, the deflector body is provided with a plurality of ribs each of which has a rib thickness, a rib height and a rib spacing and positioned in the air passage through which the air in the air duct enters. The rib thickness is thinner than thickness of the deflector body, the rib height is a height that does not contact with the air duct, and the rib spacing is defined depending on the size of width of the deflector body.

In another aspect of the present invention for accomplishing the object as described above, there is provided a vehicle including deflector bodies mounted around rear wheels side, air ducts coupled to the deflector bodies in a manner of being covered by the deflector bodies respectively to form respectively air passages for forcing air introduced externally to flow downward and discharge, wheel deflectors each of which has a plurality of ribs disposed at a rib spacing in the deflector body and positioned in a space of the air passage through which the air enters, and a floor panel forming a portion of a vehicle body to which the wheel deflectors are mounted.

In an exemplary embodiment of the present invention, the wheel deflector and the floor panel are fastened together by screws by the deflector body and the floor panel.

In the present vehicle according to an exemplary embodiment of the present invention, to which an air passage type wheel deflector is applied, the following working and effect is implemented.

First, an air passage formed by an air duct in a wheel deflector injects air to the ground during running of a vehicle, preventing formation of vortex in a space around a tire. Second, improvement of air resistance of a wheel deflector is further increased because formation of vortex in the space around the tire is prevented by high pressure of the air formed by the nozzle shape. Third, the air duct located at the rib side first absorbs impact of strike by chipping of foreign matters during running of the vehicle so that rigidity secured by ribs is kept up. Fourth, a problem of breakage (damage and rupture) is solved through rigidity of ribs without further reinforcing of thickness of the deflector body even under harsh road condition. Fifth, quality of outward appearance of the wheel deflector is greatly improved because the air duct conceals portions where the deflector body is fastened to a vehicle body so as not to be exposed directly to the outside. Sixth, injection of high pressure air by the air duct covers the high ground clearance so that any risk of breakage due to the road surface is eliminated when applying the wheel deflector in practice. Seventh, the air duct is injection-molded integrally with the deflector body from a soft material, preventing foreign matters from entering through multiple ribs and improving cost and weight efficiency.

It is to be understood that both the foregoing general description and the following detailed description of the present invention are exemplary and explanatory and are intended to provide further explanation of the invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
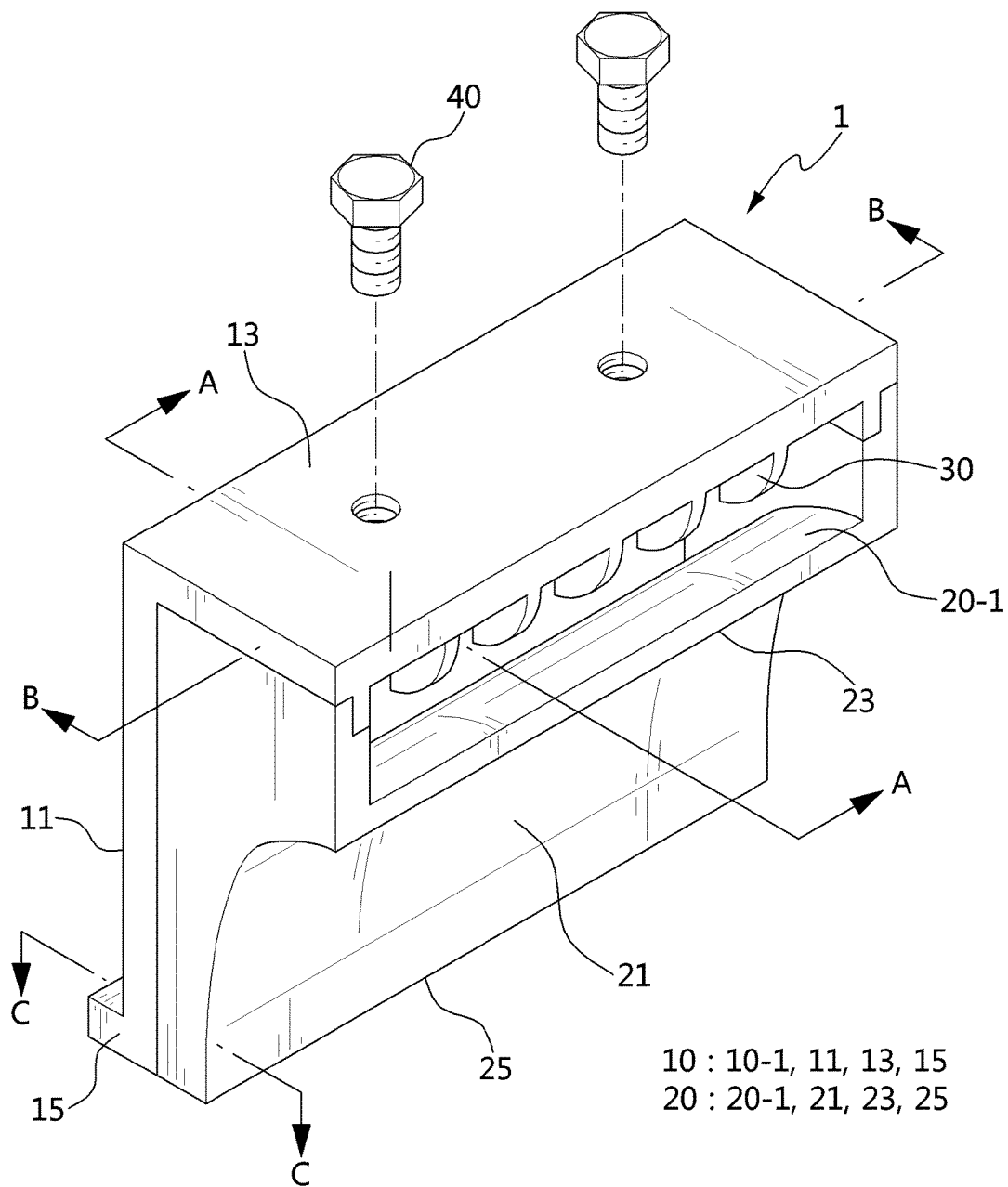
FIG. 1 is a view showing constitution of an air passage type wheel deflector according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a wheel deflector 1 includes a deflector body 10, an air duct 20, ribs 30 and screws 40.

The deflector body 10 has a predetermined size injection-molded from a soft material and functions as a base by which the air duct 20 and the ribs 30 are integrated and is formed to allow the screws 40 to penetrate therethrough. To this end, the deflector body 10 includes a flat plate-like blocking wall 11, an upper flange 13 bent with respect to the blocking wall 11 to form an upper portion of the blocking wall 11 and a lower flange 15 bent with respect to the blocking wall 11 to form a lower portion of the blocking wall 11. Furthermore, the deflector body 10 is formed with fastening holes 10-1 through which the screws 40 penetrate wherein the fastening holes 10-1 are formed in pairs at a certain interval on the upper flange 13. The fastening holes 10-1 may be formed simultaneously with injection molding of the deflector body or may be machined after the injection molding.

The air duct 20 is injection-molded from a soft material such that it has the same size as the blocking wall 11 of the deflector body 10, and then it is coupled to one side of the deflector body 10. To this end, the air duct 20 includes a nozzle body 21 coupled to the blocking wall 11 of the deflector body 10 to form an air passage 20-1 covered by the blocking wall 11, an inlet portion 23 protruding from the upper side of the nozzle body 21 to allow the air to flow into the air passage 20-1 and forming together with the upper flange 13 of the deflector body 10 a hollow space into which the air flows, and an discharge port 25 formed below the nozzle body 21 to allow the air to be discharged from the air passage 20-1 and forming together with the blocking wall 11 of the deflector body 10 a hollow space through which the air is discharged.

The ribs 30 are injection molded together with the deflector body 10 so that they are integrated with the deflector body 10. To the present end, a plurality of ribs 30 each of which protrudes from the upper flange 13 of the deflector body 10 are formed wherein each of the plurality of ribs is disposed at a constant rib spacing in the inlet portion 23 of the air duct 20.

The screws 40 are coupled respectively to the fastening holes 10-1 formed on the upper flange 13 of the deflector body 10 wherein the number of the screws is dependent on the number of the fastening holes 10-1. As for direction of fastening the screws 40, the screws may be fastened toward the deflector body 10 externally or fastened toward the outside from the deflector body 10.

Therefore, the wheel deflector 1 is manufactured by a dual injection molding method in which the deflector body 10 and the ribs 30 are injection-molded and then the air duct 20 is injection-molded.

Figure 2:
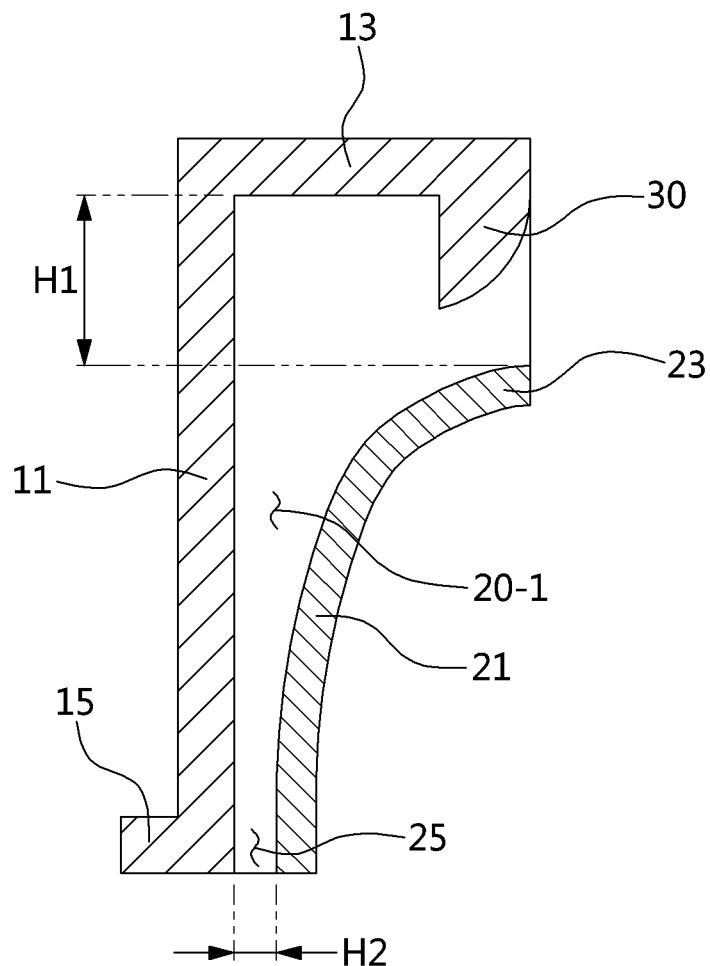
FIG. 2 is a cross sectional view of an example of an air passage formed in a wheel deflector according to an exemplary embodiment of the present invention.

FIG. 2 illustrates a cross section of the air passage 20-1 formed by coupling together the deflector body 10 and the air duct 20.

As can be seen in the present view taken in section A-A, the air passage 20-1 is formed by combining the blocking wall 11 of the deflector body 10 and the nozzle body 21 of the air duct 20 and formed in a cross-sectional shape of a half-funnel such that inflow and outflow of the air are formed vertically with respect to each other.

The deflector body 10 is bent in a direction in which the upper flange 13 forms the inlet portion 23 of the air passage 20-1, whereas the lower flange 15 is bent in a direction in which it does not block the discharge port 25 of the air passage 20-1, so that the upper flange 13 and the lower flange 15 are bent in opposite directions to each other. The length of protrusion of the lower flange 15 blocks stones bounced off by chipping and at the same time changes flow of the air passing along the tire to improve kick-up function that suppresses generation of vortex in a space around the tire. The air duct 20 is formed such that the nozzle body 21 forms a gentle curve at the inlet portion 23 and a substantially straight line around the discharge port 25. Ultimately, the air passage 20-1 is formed such that an open section of the nozzle body 21 is covered by the blocking wall 11 so that the air entering through the inlet portion 23 is accelerated during passing through the air passage in a cross-sectional shape of a half-funnel (also called as "half-funnel cross sectional shape") and then discharged through the discharge port 25.

Therefore, such a half-funnel cross sectional shape of the air passage 20-1 helps to increase velocity of the air entering through the inlet portion 23 while guiding the air entering through the inlet portion toward the discharge port 25 so that an effect of pressurizing the air is implemented.

The effect of pressuring the air in the air passage 20-1 is optimized by applying a predetermined size ratio of the inlet portion 23 to the discharge port 25. For example, as shown in FIG. 3A and FIG. 3B, air inflow height H1 of the inlet portion 23 and air outflow width H2 of the discharge port 25 may be set by the relational expression as follows:

Size ratio of air passage: $H2=H1*K$

Where "*" denotes a multiplication sign of two values and "K" is an arbitrary constant applied to simplify the equation. If necessary, the "K" may be set as a constant configured to speed of the air exiting the discharge port 25.

Figure 3A:
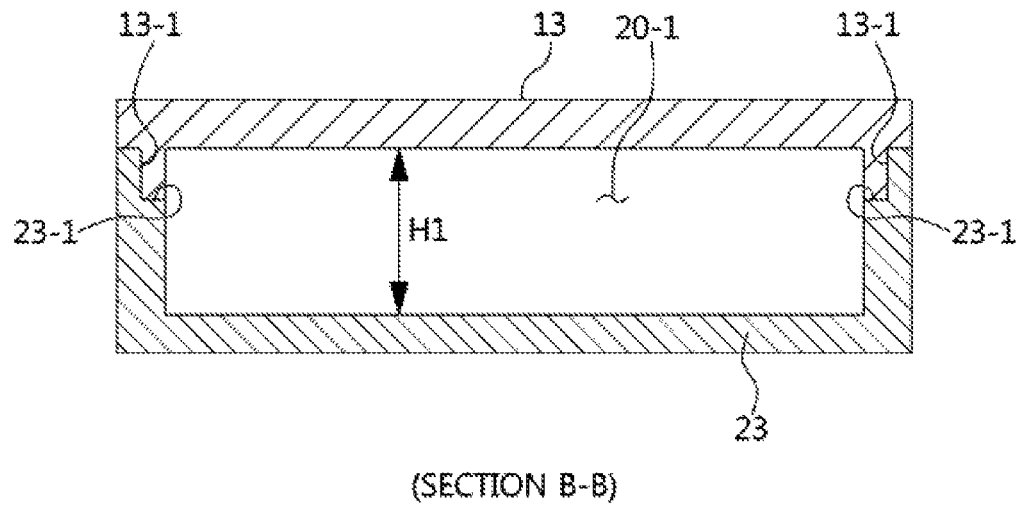
FIG. 3A and FIG. 3B represent two sectional views for showing relationship of dimensions between an inlet portion and an air discharge port which form an air passage in an exemplary embodiment of the present invention.
Figure 3B:
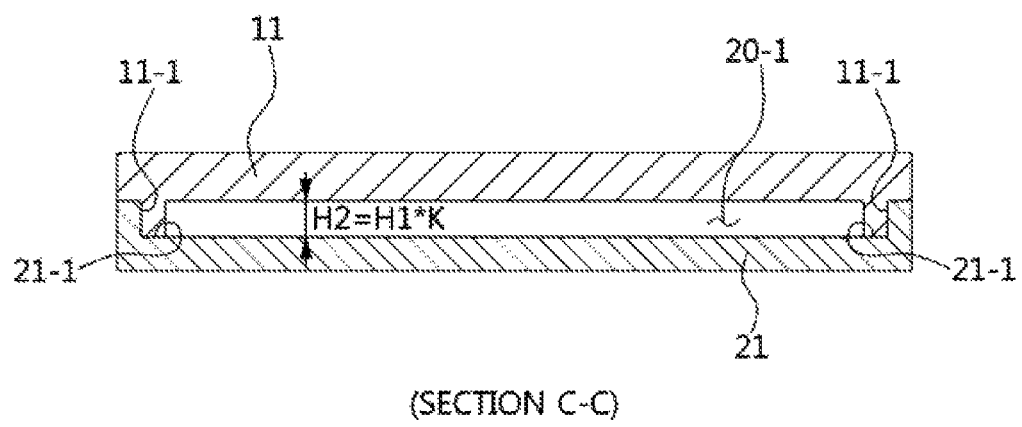

FIG. 3A and FIG. 3B illustrate cross sections of the air passage formed by coupling together the deflector body 10 and the air duct 20.

As can be seen in a view taken in section B-B, coupling between the upper flange 13 of the deflector body 10 and the inlet portion 23 of the air duct 20 is made by a double injection-molded structure having a stepped section. To the present end, the upper flange 13 is formed such that an injection-molded coupling surface 13-1 has a stepped section and the inlet portion 23 is formed such that an injection-molded coupling surface 23-1 has a stepped section. However, there is a difference between the injection-molded coupling surface 13-1 of the upper flange 13 and the injection-molded coupling surface 23-1 of the inlet portion 23 in that their respective stepped portions are staggered to each other to make a protrusion and recess coupling (or a half lap joint).

As can be seen in a view taken in section C-C, coupling between the blocking wall 11 of the deflector body 10 and the discharge port 25 of the air duct 20 is made by a double injection-molded structure having a stepped section. To the present end, the blocking wall 11 is formed such that an injection-molded coupling surface 11-1 has a stepped section and the discharge port 25 is formed such that an injection-molded coupling surface 21-1 has a stepped section. However, there is a difference between the injection-molded coupling surface 11-1 of the blocking wall 11 and the injection-molded coupling surface 21-1 of the discharge port 25 in that their respective stepped portions are staggered to each other to make a protrusion and recess coupling (or a half lap joint).

Therefore, the injection-molded coupling surfaces 11-1, 13-1 of the blocking wall 11 and the upper flange 13 of the deflector body 10 serve as rims to be fused and the injection-molded coupling surfaces 23-1, 21-1 of the inlet portion 23 and the discharge port 25 of the air duct 20 serve as rims to be fused. Fusing the former and latter rims together generates fixing force between the deflector body 10 and the nozzle body 20.

Figure 4:
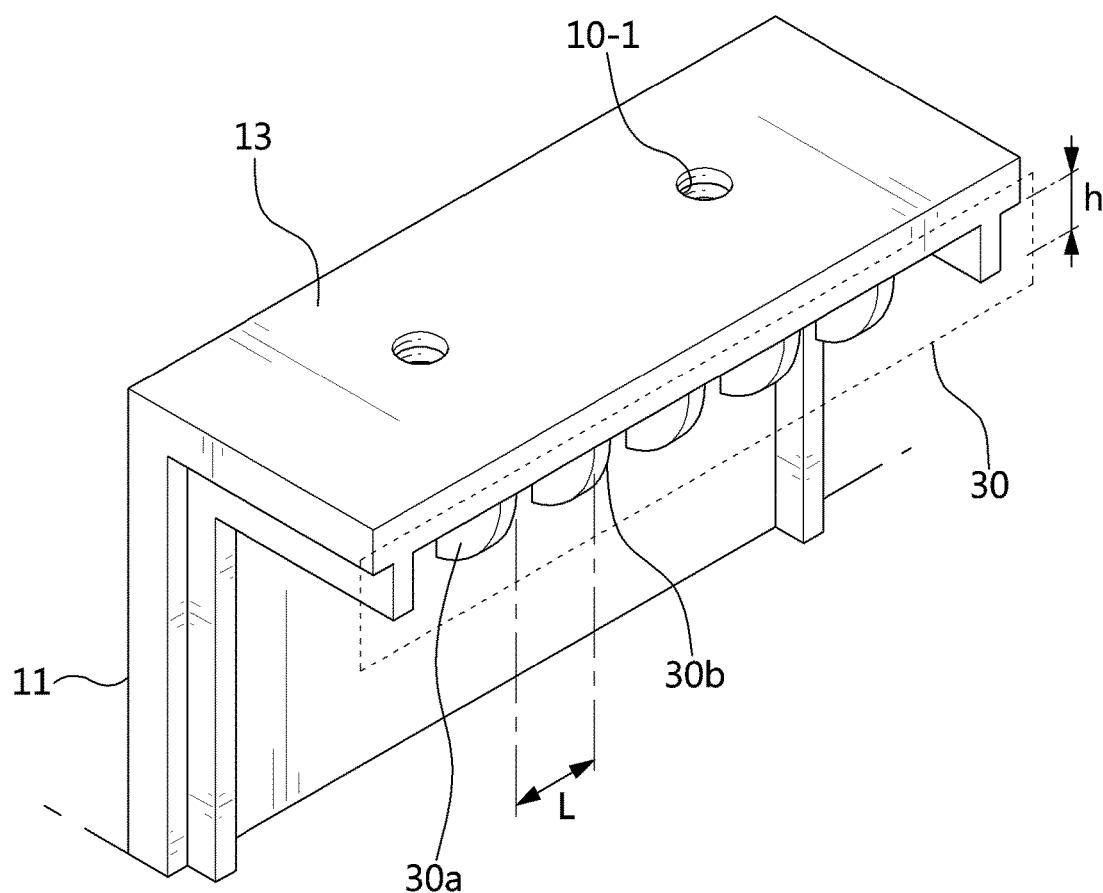
FIG. 4 is a view showing an example of ribs formed in a wheel deflector according to an exemplary embodiment of the present invention.

Referring to FIG. 4, each of the ribs 30 has a predetermined rib thickness and a predetermined rib height h and a plurality of ribs 30 are formed at a rib spacing L between a first rib 30a and a second rib 30b. The rib thickness is relatively thin compared to width formed by the inlet portion 23 of the air duct 20, the rib height is relatively low compared to height formed by the inlet portion 23 of the air duct 20, and the rib spacing is set such that inflow of stones chipped can be blocked without interfering with inflow of the air through the inlet portion 23 of the air duct 20.

For example, a relational expression between the rib thickness, the rib height and the rib spacing is as follows:

Size ratio of rib thickness: rib thickness<$A$ %

Size ratio of rib height: rib height<$B$ %

Size ratio of rib spacing: rib spacing<$C$ %

Where "A" is a set value which may be set to 30% of thickness of the deflector body, "B" is a set value which may be set to 70% of the air inflow height H1 of the inlet portion 23, and "C" is a set value which may be set to 7 to 8% of width of the deflector body 10 or width of the inlet portion 23.

As a result, the rib thickness is set as a ratio to the thickness of the deflector body 10 so that injection moldability by which any sink is prevented is secured, while the rib height is to cover the inlet portion 23 of the air duct 20 and at the same time secure aerodynamic performance. The rib spacing can block inflow of the chipped stones without interfering with inflow of the air through the inlet portion 23 of the air duct 20.

Figure 5:
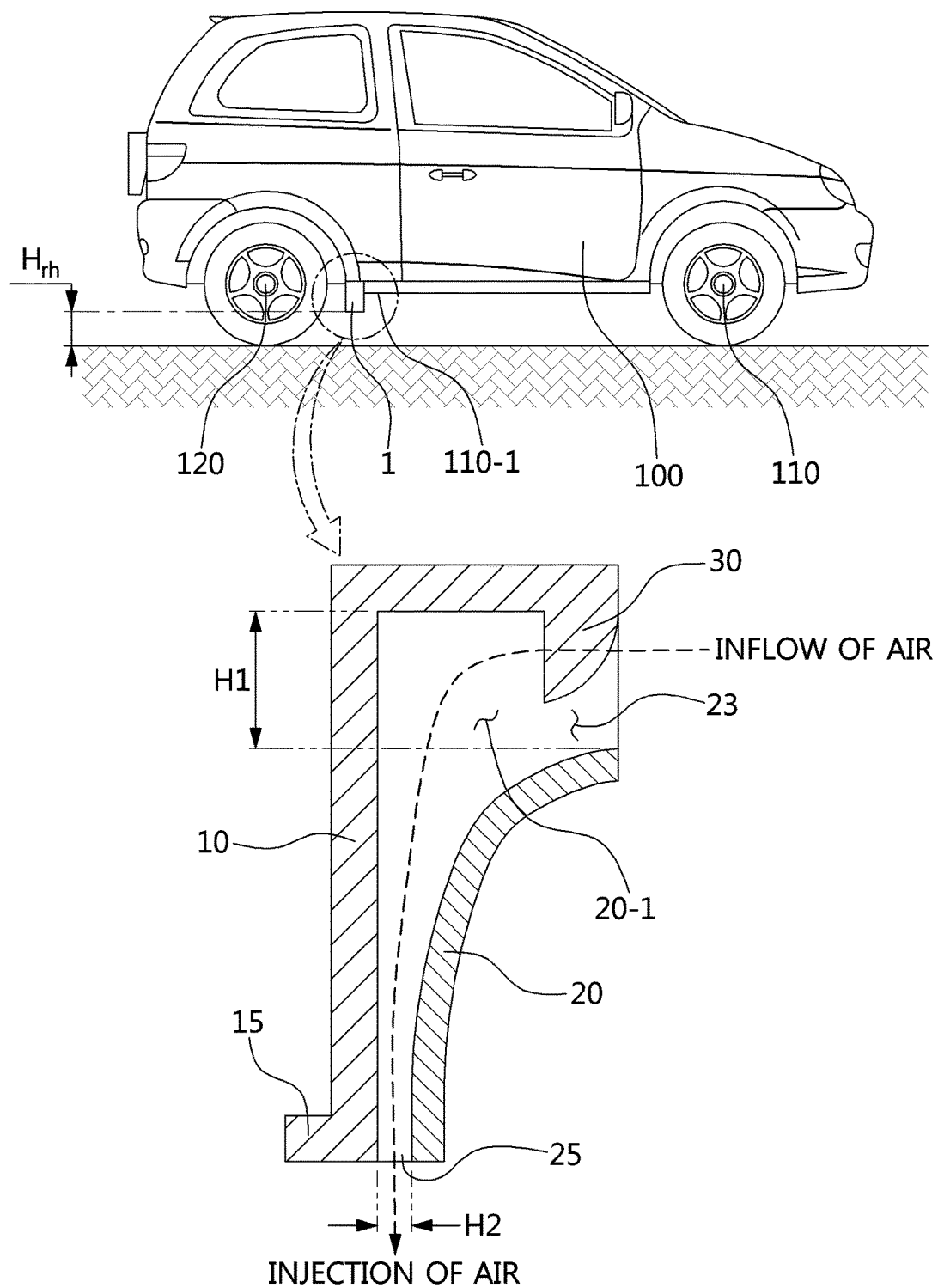
FIG. 5 is a view showing an example of a vehicle to which an air passage type wheel deflector according to an exemplary embodiment of the present invention is applied.

Referring to FIG. 5, the wheel deflectors 1 are mounted around the rear wheels 120 respectively in a vehicle 100 as shown in the present figure, but it is preferably mounted around front wheels 110 as well in the same manner. In the instant case, the wheel deflector 1 has a size to cover width of a tire and is mounted on a floor panel 100-1 (or a side sill) of the vehicle body such that it has a predetermined deflector height $H_{rh}$ with respect to the ground.

, the present wheel deflector 1 includes the deflector body 10, the air duct 20, the ribs 30 and the screws 40 and thus, it is the same as the wheel deflector 1 as described with reference to FIGS. 1 to 4. The screws 40, however, are screwed into the floor panel 100-1 (or the side sill) through the fastening holes 10-1 of the deflector body 10 to form the fixed state of the wheel deflector 1.

The aerodynamic performance, durability performance and noise reduction performance of the wheel deflector 1 during running of the vehicle 100 are described below.

The aerodynamic performance is formed by the features that the air flowing along the vehicle 100 is forced to enter through the inlet portion 23 of the air duct 20 coupled to the deflector body 10 and the air introduced is forced to pass through the air passage 20-1 and exit the discharge port 25 of the air duct 20 coupled to the deflector body 10. In the present process, the difference between the air inflow height H1 and the air outflow width H2 of the discharge port 25 increases outflow air velocity of the air exiting the discharge port 25 compared to inflow air velocity of the air entering through the inlet portion 23 and at the same time the half-funnel cross sectional shape of the air passage 20-1 imparts an effect of pressurizing the air, which further increases the air velocity. As a result, the wheel deflector 1 makes it possible for high pressure air to be injected to the ground at the rear wheel 120 side, improving the kick-up function that suppresses generation of vortex in the space around the tire, with the result that the air resistance is improved.

The durability performance is formed by the feature that even if stones on the road surface are bounced off toward the inlet portion 23 of the air duct 20 coupled to the deflector body 10 by chipping resulting from running of the vehicle 100, such stones are blocked by a plurality of ribs 30 spaced to each other at a certain rib spacing to cover the inlet portion 23 of the air duct 20. In the present process, the ribs 30 act as blocking walls that either change an angle of strike by chipping of a stone or prevent the stone from entering the air passage 20-1 without affecting flow of the air. As a result, as the deflector body 10 can be protected from breakage, durability performance of the wheel deflector 1 is improved.

The noise reduction performance is improved in that the inlet portion 23 of the air duct 20 coupled to the deflector body 10 is formed with a hollow air inflow space whereby a portion of noise introduced into the internal of the vehicle due to strike by chipping is absorbed.

As described above, the air passage type wheel deflector applied to the vehicle according to the present embodiment includes a deflector body 10 fastened to the floor panel by screws 40 and mounted at the rear wheel 120 side, an air duct 20 forming an air passage 20-1 for forcing the air introduced externally to flow downward and discharge in a state of being covered by the deflector body 10 coupled to the air duct, and a plurality of ribs 30 disposed in the deflector body 10 at a certain rib spacing and positioned in the space of the air passage 20-1 so that robustness against strike by chipping is maintained and at the same time aerodynamic performance is improved resulting from improvement of the kick-up function by the air passage 20-1.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel deflector comprising an air passage formed by combining an air duct with a deflector body such that air introduced externally is forced to flow downward and discharge,
   wherein the air passage includes an inflow and an outflow of air formed vertical to the inflow,
   wherein the deflector body includes a first rim and the air duct includes a second rim, the first rim includes a first stepped section and the second rim includes a second stepped section joined to the first stepped section,
   wherein the deflector body includes a blocking wall and an upper flange bent from the blocking wall,
   wherein the air duct includes a curved nozzle body coupled to the blocking wall and an inlet portion formed by the curved nozzle body and the upper flange of the deflector body to form the inflow of the air, and
   wherein the air passage allows the air to be introduced in an air inflow height formed by the upper flange and the inlet portion and allows the air to be discharged in an air outflow width formed through a discharge portion formed by the curved nozzle body and a lower portion of the blocking wall.

2. The wheel deflector according to claim 1, wherein the air passage is curved from the air inflow height to the air outflow width and wherein the air outflow width is formed to be smaller than the air inflow height so that flow of the air passing through the air passage is accelerated.

3. The wheel deflector according to claim 1, wherein the deflector body includes a lower flange formed on the blocking wall and wherein the lower flange is bent from the blocking wall in a direction opposite to the direction in which the upper flange is bent.

4. The wheel deflector according to claim 1, wherein the deflector body is provided with a rib and wherein the rib is disposed in the air passage of the air duct, through which the air enters.

5. The wheel deflector according to claim 4, wherein the rib defines a rib thickness and a rib height and wherein the rib thickness is thinner than a thickness of the deflector body and the rib height is a height that does not contact with the air duct.

6. The wheel deflector according to claim 5, wherein the rib thickness is set to 30% of a thickness of the deflector body.

7. The wheel deflector according to claim 4, wherein the rib is configured as a plurality of ribs disposed at a rib spacing.

8. The wheel deflector according to claim 7, wherein the rib spacing is set to 7 to 8% of a thickness of the deflector body.

9. The wheel deflector according to claim 4, wherein each of the deflector body, the air duct and the rib includes a soft material.

\* \* \* \* \*